March 30, 1926.
N. W. BYWATER
SIDE INCLOSURE FOR AUTOMOBILES
Filed Oct. 31, 1924
1,578,641
5 Sheets-Sheet 2
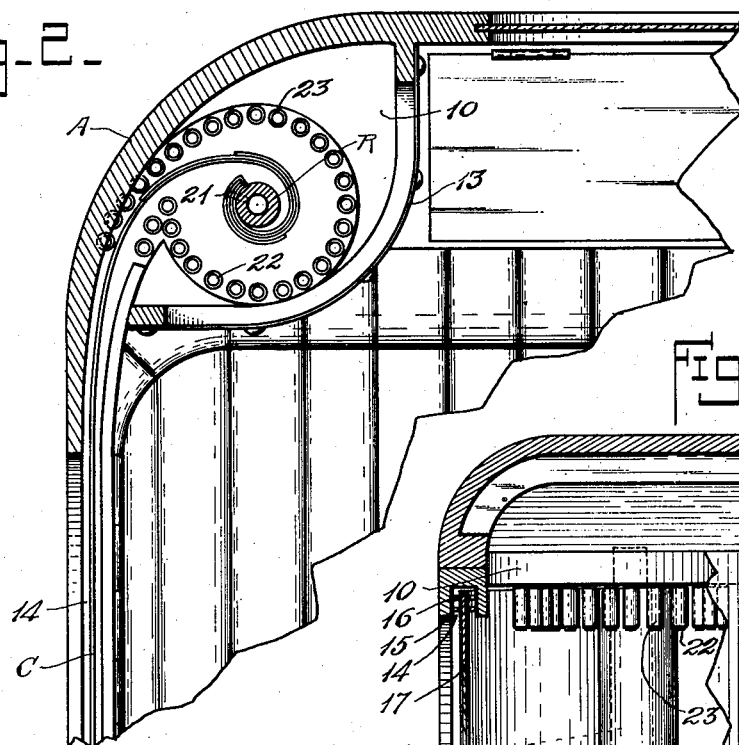
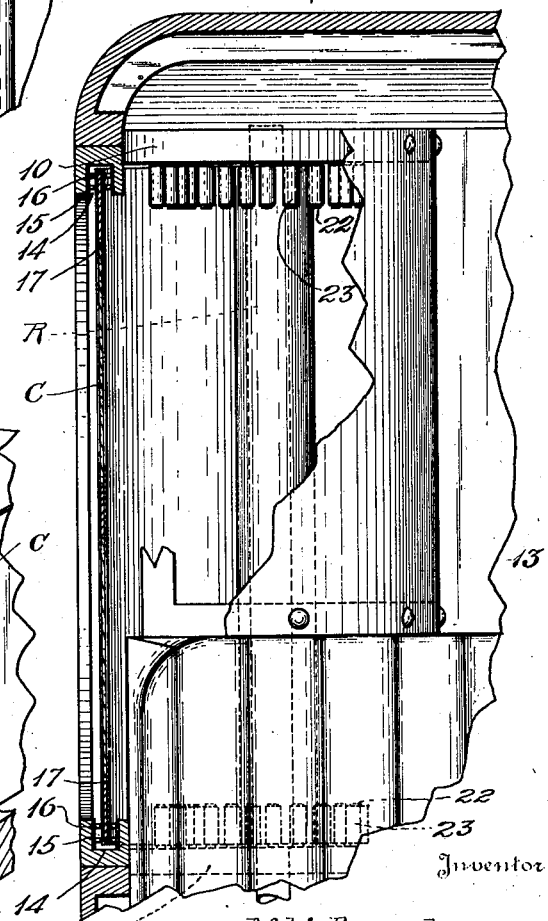
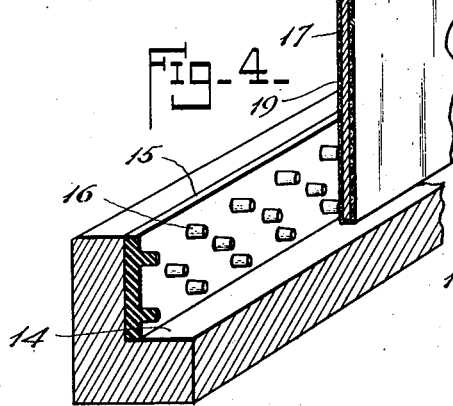
Inventor
N. W. Bywater,
By
Attorney March 30, 1926.
N. W. BYWATER
SIDE INCLOSURE FOR AUTOMOBILES
Filed Oct. 31, 1924.    5 Sheets-Sheet 3
1,578,641
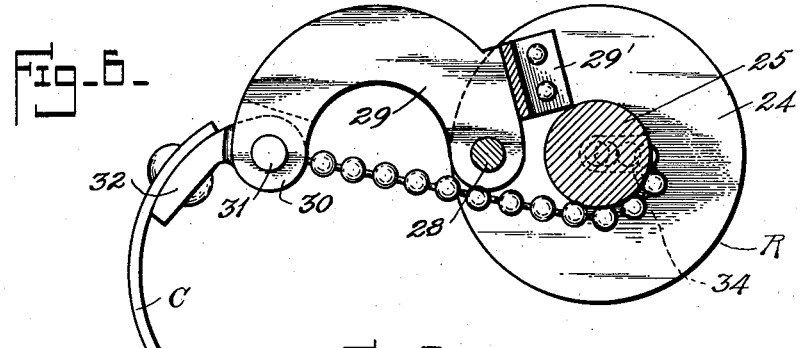
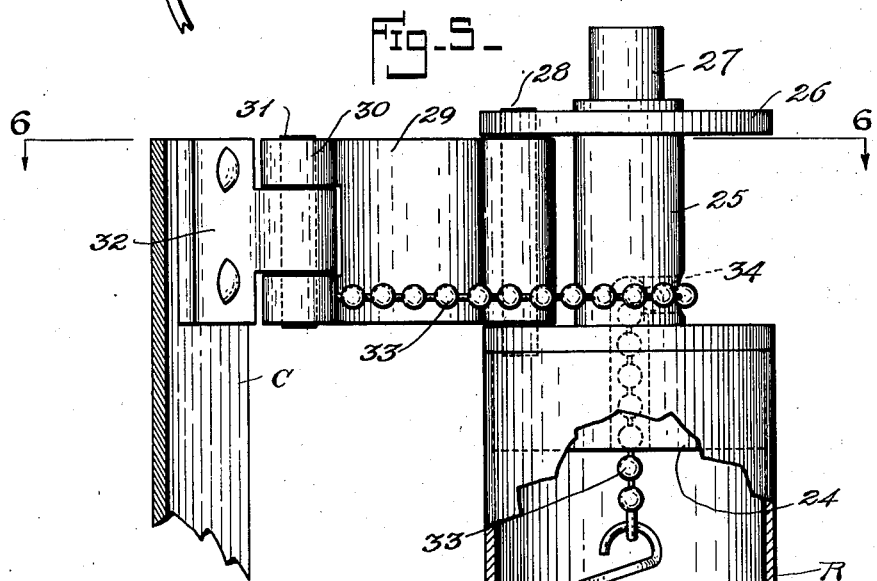
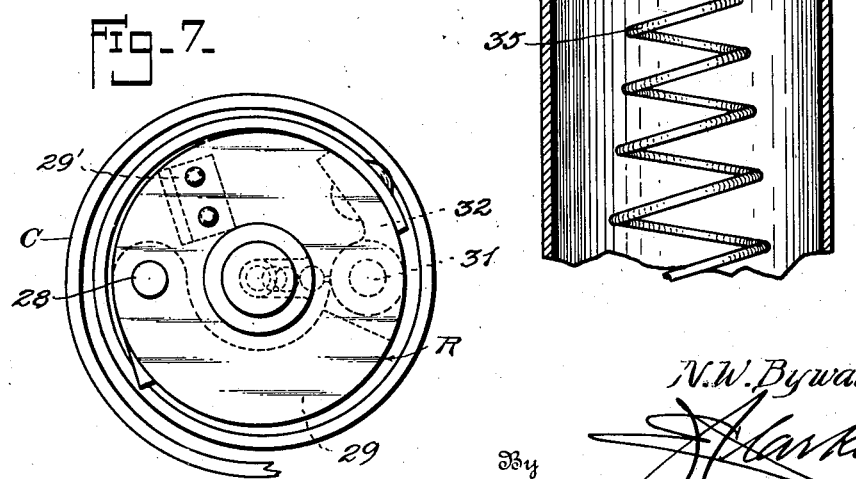
Inventor
N. W. Bywater,
By
Attorney

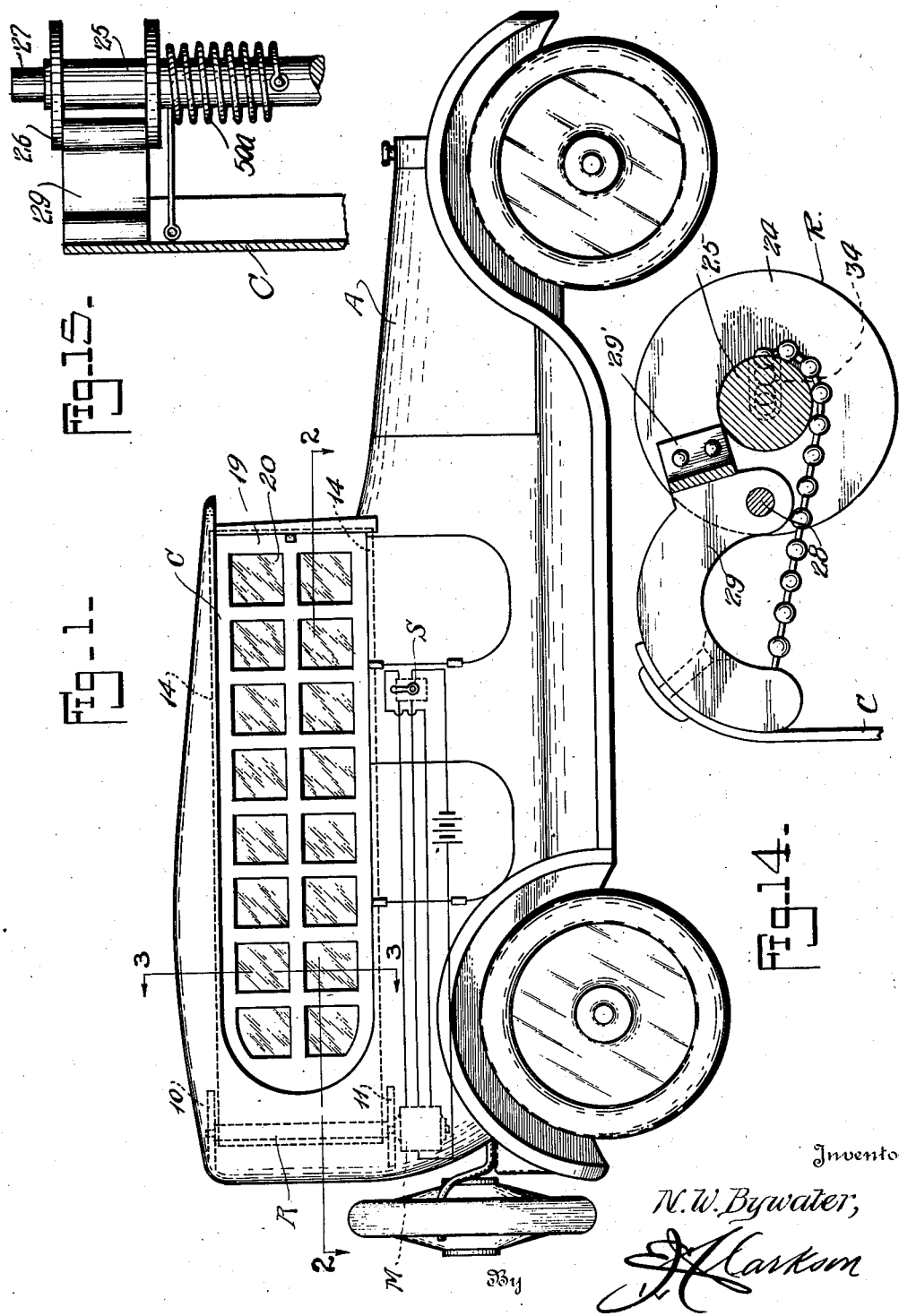

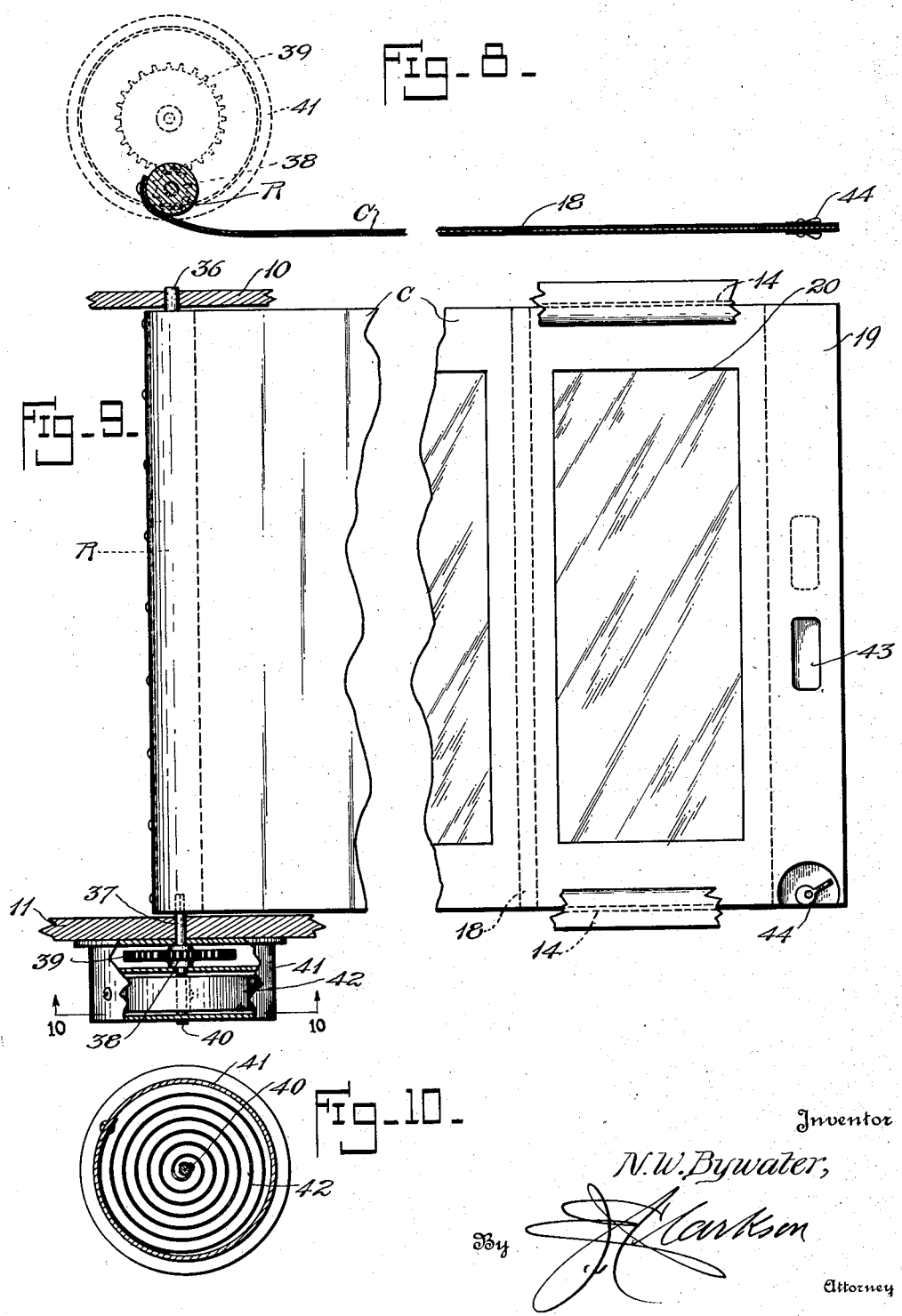

March 30, 1926. 1,578,641
N. W. BYWATER
SIDE INCLOSURE FOR AUTOMOBILES
Filed Oct. 31, 1924 5 Sheets-Sheet 5
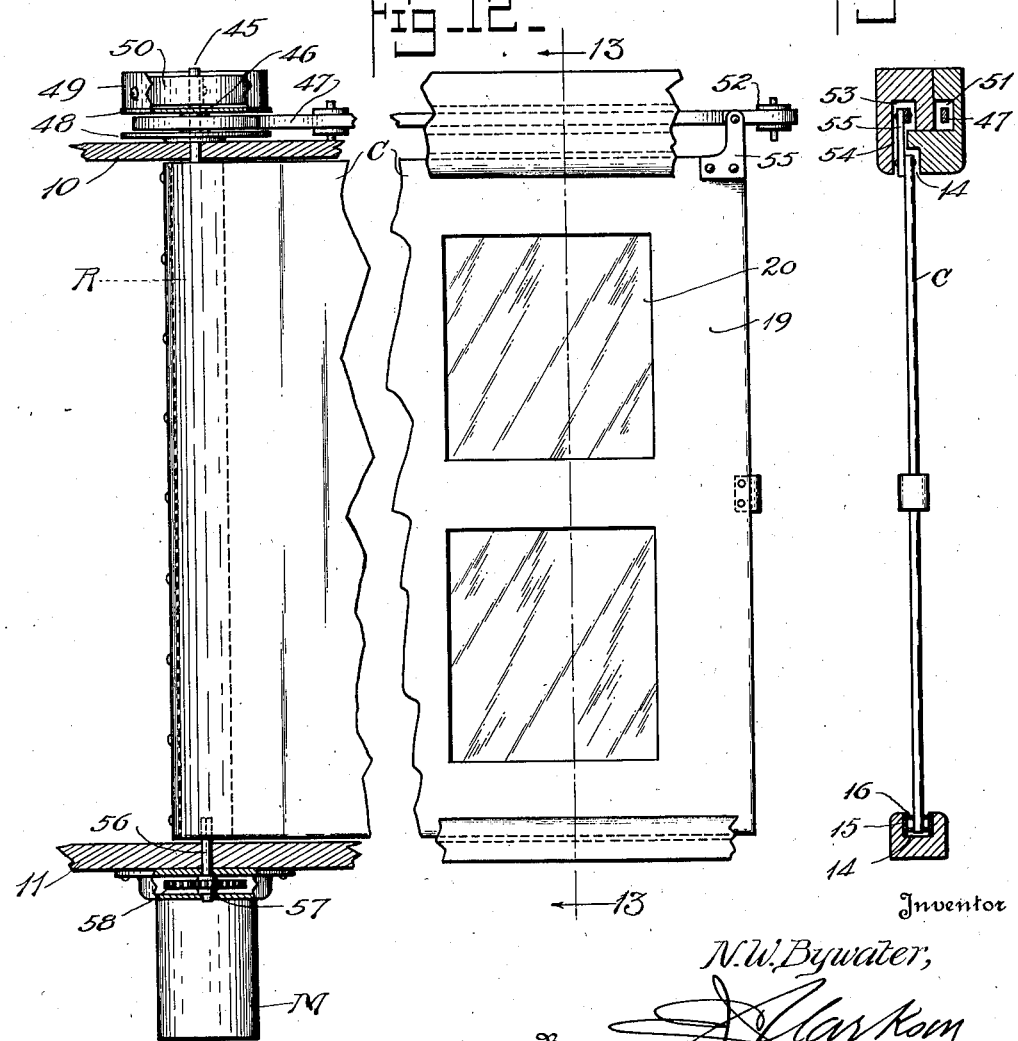

Patented Mar. 30, 1926.

1,578,641

UNITED STATES PATENT OFFICE.

NORBERT W. BYWATER, OF LOUISVILLE, KENTUCKY.

SIDE INCLOSURE FOR AUTOMOBILES.

Application filed October 31, 1924. Serial No. 747,003.

*To all whom it may concern:*

Be it known that NORBERT W. BYWATER, a citizen of the United States, residing at Louisville, in the county of Jefferson and State of Kentucky, has invented certain new and useful Improvements in Side Inclosures for Automobiles, of which the following is a specification.

This invention relates to automobiles and has special reference to curtains or closures for the bodies of automobiles and other like vehicles.

More particularly the invention relates to a side curtain or panels for automobiles arranged to roll upon a roller either wholly or in part whereby an open car may be quickly converted into a closed car without the necessity of fitting on a series of small curtains and buttoning them into place in the manner most frequently found to be the means for closing a car during cold or stormy weather.

One important object of the invention is to provide an improved general construction for devices of this character.

A second important object of the invention is to provide a novel curtain or panel arrangement wherein a curtain or panel, is supported at one end of the side of an automobile on a roller, the parts being so arranged that the curtain or panel may be partly or wholly wound upon the roller or partly or wholly unwound therefrom to cover or uncover the side.

A third important object of the invention is the provision of a curtain or panel of this class wherein the winding on the roller may be effected by suitable motor means, either electric, spring or other power.

A fourth important object of the invention is the provision of an improved arrangement of this curtain wherein a spring winding roller is employed in connection with electrically operated means for unwinding the curtain against the tension of the spring.

A fifth important object of the invention is the provision of improved means for securing a curtain or panel of this type to its roller.

A sixth important object is the provision of roller bearings or guides to enable the panel or curtain to push out in the act of closing the car.

A seventh important object of the invention is to provide a construction for the panel or curtain so that it will maintain itself in position in the grooves without necessity of using other means.

An eighth important object of this invention is the provision of improved anti-rattling guide means for such a curtain.

It will be noted that the essential features of the invention comprises a reversible motor, a roller, a panel having longitudinal flexible strips of spring metal and supporting unrights, links fastened to the panel and pivoting on the roller, roller guides for the panel adjacent the supporting roller and grooves wherein the panel is slidably mounted.

In the accompanying drawings, like characters of reference indicate like parts in the several views, and:—

Figure 1 is a side elevation of an automobile showing the curtain panel in its fully closed condition.

Figure 2 is an enlarged detail section on the line 2—2 of Figure 1.

Figure 3 is an enlarged detail section on the line 3—3 of Figure 1.

Figure 4 is a detail perspective view showing the lower part of a portion of the curtain and disclosing also one of the anti-rattler guide strips.

Figure 5 is a side elevation of the upper part of one of the rollers, the view showing the manner of securing a curtain or panel thereto and the roller being broken away to disclose the interior.

Figure 6 is a section on the line 6—6 of Figure 5.

Figure 7 is an end view of one of the rollers showing a portion of the curtain or panel rolled up thereon.

Figure 8 is a horizontal section through a portion of a curtain and showing the arrangement used when a spring motor is used for winding the curtain or panel onto the roller.

Figure 9 is a partial side elevation of the arrangement seen in Figure 8, curtain or panel parts being broken away.

Figure 10 is a section on the line 10—10 of Figure 9.

Figure 11 is a plan view partly broken away and showing a modified form of curtain or panel handling device wherein the curtain or panel is wound on the roller by an electric motor acting against certain spring upwinding means.

Figure 12 is a side view of the modification shown in Figure 11, certain of the parts being broken away and others shown in section.

Figure 13 is a section on the line 13—13 of Figure 12.

Figure 14 is a view similar to Figure 6 but showing a modified form of attachment between the curtain or panel and the roller.

Figure 15 is a view showing a modified tension spring arrangement and the roller used therewith.

In the general form of the invention the device embodies a curtain C which runs in suitable top and bottom guides along the open sides of the automobile A. This curtain is arranged to wind onto a roller R the winding being preferably accomplished by a motor M controlled by a switch S adjacent the driver's seat. This switch is so arranged that the motor may be reversed by a proper movement of the switch handle, the motor being of the reversible type. The wiring and details of the switch and motor are such as are well known in the art and are therefore not deemed necessary to be specifically set forth in this specification. Moreover, it is obvious that the operating parts of such a switch may be positioned at any suitable place and may, if desired, be multiplied so that the motor may be controlled from two or more points either within or without the car. Still further the particular actuating means for the switch may be of any convenient type such as handles, keys, knobs or push buttons.

In the form of the device shown in Figures 2 and 3 the roller R takes the form of a plain hollow tube the upper end of which is journalled in a bracket 10 while its lower end passes through the lower bracket 11 and has suitable operative connection to the motor M so that the roller will revolve in one direction or the other accordingly as the motor is caused to revolve forward or backward. Each roller is located preferably in a rear corner of the automobile body and is housed in by a casing 13. Extending along the open sides of the automobile are U-shaped guides of channels 14 each of which has its sides lined with strips 15 of rubber or other like material and projecting inwardly from these strips are fingers 16, the ends of the fingers on one strip being spaced somewhat from the ends of the fingers on the other strip so that the top and bottom portions of the curtain C may move beween these fingers and be prevented by them from slatting sidewise and thus producing a rattling noise.

The frame of the curtain C consists of upper and lower metallic strips 17, which may be connected by vertical strips 18 (see Figure 8), these strips serving to support the curtain body 19 which may be made of the same material as the automobile top or may be of any other preferred material as desired. Tansparent panels 20 may be set in the curtain at suitable places and these panels may either be all of flexible material such as celluloid or certain of the panels toward the front of the curtain may be of rigid material like glass in which case it will be obvious that only the rear, flexible portions of the curtain can be rolled up. In such a case as this the rigid ends of the curtains act as the side curtains at the rear of the automobile when the sides are open as far as possible. The strips 17 are preferably of stiffly elastic material so that the action of the motor in unrolling the curtain will serve to push the unrolled portion along the grooves. The rear end of the curtain is secured, in this form, directly to the roller R by means of screws or pins 21. In order to guide the curtain in its passage to and from the roller the brackets 10 and 11 are provided with pins 22, these pins depending from the bracket 10 and standing up from the bracket 11. On these pins are rollers 23 and each set of pins and rollers are arranged in an arcuate series about the respective end of the roller R, the series being extended at the space between the ends of the arc to form parallel rows, this arrangement being clearly shown in Figure 2.

In place of connecting the curtain directly to the roller it is frequently found desirable to employ a special connection such as is shown in Figures 5, 6, and 7. In this type of connection each end of the roller R is closed by a plug 24 having a reduced extension 25 provided adjacent its end with a collar 26, the extension having its extremity reduced as at 27 to form the roller journal. Between the plug 24 and collar 26 extends a pin 28 whereon is pivoted one end of an arcuate arm 29 having spaced lugs 30 at its free end to receive a pivot pin 31. This arm is held from too great movement by a strip 29'. This arm 29 is also so shaped and proportioned that it may swing inward as in Figure 7 to closed or housed position between the plug and collar. Pivoted on the pin 31 is an attaching lug 32 which is riveted to one of the strips 17. Extending from the outer end of the arm 29, being preferably attached to one of the lugs 30, is a chain 33 which passes through an opening 34 extending from the side of the extension 25 inward to the center and then downward through the plug 24 to one end of a coiled tension spring 35. Thus this spring through the chain tends constantly to fold the arm inward and it is only when the curtain is almost completely unrolled that the arm 29 swings outward as shown in Figures 5 and 6.

In the form shown in Figures 8, 9 and 10 the electric motor operation is eliminated and a spring winding or rolling up motor is used. In this form the roller R is provided with pintles 36 and 37 and on the latter is mounted a pinion 38 which meshes with a gear 39 fixed on a shaft or arbor 40 journalled in a spring box 41. To this arbor is connected one end of a spiral spring 42 the other end of said spring being fixed to the inside of the box 41 the latter being held unmovable by its attachment to the bracket 11. With this arrangement the end of the curtain is provided with finger sockets 43 and at the bottom of the curtain are clamp dogs 44 to hold the curtain against retraction by the spring 42.

In the form of the device shown in Figures 11, 12 and 13 the roller R is provided with an upper pintle 45 whereon is a drum 46 having a tape or band 47 wound thereon in a direction opposite that in which the curtain is wound. This drum is located between two guide plates or collars 48, the lower of these being fixed to the bracket 11 while the upper carries a spring box 49 wherein is a spiral spring 50 having its outer end fixed to the box and its inner end carried by the pintle 45. This spring is so arranged that the tension on the curtain and tape will at all times be maintained uniform. The tape 47 travels in a passage 51 above and to the side of the upper guide slot until it reaches the front of the automobile body where it passes around a guide pulley 52 and into a passage 53 immediately above the upper guide slot and communicating with that slot by means of a slit 54. Carried by the end of the tape is an attaching lug or plate 55 which is secured to the upper front corner of the curtain C. It will thus be noted that the action of unrolling the curtain winds the tape up and tensions the spring. The lower pintle 56 of the roller carries a pinion 57 wherewith meshes the gear 58 of the motor M. It is obvious that, in this form of the device the curtain may be made without the longitudinal strips 17 since it is drawn out as well as in and that the same thing is true in the form of Figures 8, 9, and 10 where the unrolling is accomplished by manual traction on the front end of the curtain.

It will be noted that the guide plates, drum and spring box are integral and the pintle 45 revolves therein.

In the modification illustrated in Figure 14 will be seen that the link 32 is omitted and the curtain or panel is connected directly to the link 29.

In the modification shown in Figure 15 it will be seen that the spring box 49 and spring 50 are omitted, the central part of the roller being surrounded by a coil spring 50ª one end of which is connected to the roller while the other end is connected to the wall or casing 13.

There has thus been provided a simple and efficient device of the kind described and for the purpose specified.

It is obvious that minor changes may be made in the form and construction of the invention without departing from the material principles thereof. It is not therefore desired to combine the invention to the exact form herein shown and described but it is wished to include all such as properly come within the scope claimed.

Having thus described the invention, what is claimed as new is:—

1. In combination, a curtain, slotted guides for the side edges of said curtain and elastic fingers of rubber like material projecting inwardly and perpendicularly from the sides of the guide slots and arranged to bear against the curtain adjacent its edges.

2. In combination, a curtain slotted guides to the side edges of said curtain, elastic linings of rubber like material for the sides of the slots and extending the entire length thereof and fingers formed integrally of the elastic strips and projecting inwardly of the slots to engage the faces of the curtain adjacent its side edges.

3. The combination with an automobile body having side openings extending from front to rear of each side; of housings at the opposed slots and positioned at the top and bottom of each side opening, a curtain on each roller, guide rollers arranged about the upper and lower ends of each curtain roller and arranged to guide the curtains out of the housings and into the slots of the guides, and a motor arranged to rotate in one direction to cause the curtain roller to roll the curtain up and in the other direction to cause the curtain roller to unroll the curtain and move it outwardly along the guide slots.

4. The combination with an automobile body having side openings extending from front to rear of each side; of housings at the rear of the body, a curtain roller mounted in each housing, upper and lower guides having opposed slots and positioned at the top and bottom of each side opening, a curtain on each roller, said curtains having their longitudinal edges reinforced with strips of elastic metal, guide rollers arranged about the upper and lower ends of each curtain roller and arranged to guide the curtains out of the housings and into the slots of the guides, and a motor arranged to rotate in one direction to cause the curtain roller to roll the curtain up and in the other direction to cause the curtain roller to unroll the curtain and move it outwardly along the guide slots.

5. The combination with an automobile body having side openings extending from front to rear of each side; of housings at the rear of the body, a curtain roller mounted in each housing, upper and lower guides having opposed slots and positioned at the top and bottom of each side opening, a curtain on each roller, guide rollers arranged about the upper and lower ends of each curtain roller and arranged to guide the curtains out of the housings and into the slots of the guides, a motor arranged to rotate in one direction to cause the curtain roller to roll the curtain up and in the other direction to cause the curtain roller to unroll the curtain and move it outwardly along the guide slots, and spring means connected to said roller and urging the latter to roll the curtain up thereon.

6. The combination with an automobile body having side openings extending from front to rear of each side; of housings at the rear of the body, a curtain roller mounted in each housing, upper and lower guides having opposed slots and positioned at the top and bottom of each side opening, a curtain on each roller, said curtains having their longitudinal edges reinforced with strips of elastic metal, guide rollers arranged about the upper and lower ends of each curtain roller and arranged to guide the curtain roller out of the housings and into the slots of the guides, a motor arranged to rotate in one direction to cause the curtain roller to roll the curtain up and in the other direction to cause the curtain roller to unroll the curtain and move it outwardly along the guide slots, and spring means connected to said roller and urging the latter to roll the curtain up thereon.

7. In a device of the kind described, a curtain roller, a pair of swinging arms each pivoted to the roller eccentrically thereof and adjacent a respective end, a curtain having one end connected at its top and bottom to said arms, and spring means urging said arms into inwardly folded position with respect to the roller.

8. In a device of the kind described, a curtain roller including a hollow body, closures for the ends of said body having extensions arranged axially of the body and of less diameter than said body, a collar on each extension, a pivot pin extending between each collar and the respective closure, arcuate arms each having one end mounted on a respective pivot pin and arranged to swing inwardly between the collar and closure supporting said pivot pin and to swing outwardly therefrom, a strip on each closure limiting the outward movement of said arms, a curtain supported by the outer ends of said arms, chains each connected to an arm and extending inwardly of the roller, said chains being so arranged that traction thereon tends to swing the arms inwardly, and spring means within the roller exciting constant traction on said chains.

In testimony whereof I affix my signature.

NORBERT W. BYWATER.